United States Patent
Gain et al.

(10) Patent No.: US 10,611,086 B2
(45) Date of Patent: Apr. 7, 2020

(54) SYSTEM AND METHOD FOR EVALUATING ADDITIVE MANUFACTURING INDEX

(71) Applicant: Caterpillar Inc., Peoria, IL (US)

(72) Inventors: Arun Lal Gain, Champaign, IL (US); Marchione Thierry Andre, Heber, UT (US); Austin Joseph Schmidt, Macedonia, OH (US); Yihong Yang, Champaign, IL (US); Nathan John Parsons, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 15/246,587

(22) Filed: Aug. 25, 2016

(65) Prior Publication Data
US 2016/0361878 A1   Dec. 15, 2016

(51) Int. Cl.
*B29C 64/386*  (2017.01)
*B33Y 50/00*  (2015.01)

(52) U.S. Cl.
CPC ............ *B29C 64/386* (2017.08); *B33Y 50/00* (2014.12); *G05B 2219/2646* (2013.01); *G05B 2219/49023* (2013.01)

(58) Field of Classification Search
CPC . B29C 67/0088; B33Y 50/00; G05B 23/0221; G06K 9/28; G06T 17/10; G06T 17/20; G06T 7/602; G06F 3/126; G06F 3/1203; G06F 3/1222; G06F 16/51; H04N 1/00827; H04N 1/32529
USPC ........ 345/419, 581, 606, 611; 700/98; 703/2
See application file for complete search history.

(56) References Cited

U.S. PATENT DOCUMENTS

2015/0205544 A1  7/2015 Webb et al.
2016/0210312 A1*  7/2016 Webb ................. G06Q 30/0635

\* cited by examiner

*Primary Examiner* — Mouloucoulaye Inoussa
(74) *Attorney, Agent, or Firm* — Harrity & Harrity LLP

(57) ABSTRACT

A method for evaluating part for additive manufacturing is provided. The method includes receiving data related to a set of printability factors associated with the part. The set of printability factors comprise at least: an availability of a three dimensional printer, a build density, a fraction of part to be printed, a print accuracy, a part complexity, and a number of parts needed. The method includes evaluating a printability index associated with the part based on at least three printability factors from the set of printability factors. Further, the method includes displaying the printability index associated with the part for the evaluation of the part for additive manufacturing.

20 Claims, 9 Drawing Sheets

| Availability | Capability | Printer Name |
|---|---|---|
| Online | No | Printer_1 |
| Offline | Yes | Printer_2 |
| Online | Yes | Printer_3 |

FIG. 3

|  | Part_1 | Part_2 | Part_3 |
|---|---|---|---|
| Mass (Kg) | 0.5554 | 0.2985 | 0.1212 |
| Volume (mm³) | 70667.3 | 41177.8 | 15477.3 |
| Dimensions (mm) | (95.0, 95.0, 42.9) | (43.7, 106.5, 41.5) | (59.7, 28.6, 36.5) |
| Suitable Printers | Printer_1 Printer_2 Printer_3 | Printer_2 Printer_3 | Printer_3 |
| Printability | No | Yes | Yes |
| Printability Index (Max 10) | 5.94 | 9.02 | 8.81 |
| Printing Material | Titanium Superalloy (High Purity) | Titanium Superalloy (High Purity) | Titanium Superalloy (High Purity) |
| Printing Cost ($) | 1591.88 | 855.60 | 347.45 |
| Traditional Cost ($) | 2.63 | 1.42 | 0.57 |

*FIG. 7*

SYSTEM AND METHOD FOR EVALUATING ADDITIVE MANUFACTURING INDEX

TECHNICAL FIELD

The present disclosure relates generally to an evaluation system associated with additive manufacturing, and more particularly, to a system and method for evaluating a part for additive manufacturing.

BACKGROUND

Three dimensional (3D) printing is used to make a solid object of desired shape using a 3D model. 3D printing also known as additive manufacturing is a process in which successive layers of material are laid down as per the shape of the 3D object to be formed.

Typically, a designer creates a digital model of a part to be printed using any known object modeling software or computer aided design (CAD) software. After the 3D model is created, a print operation of the part may be initiated using a suitable 3D printer. Some 3D printers are capable of printing relatively large parts, while others are capable of printing parts with complex geometries.

Generally a manual process is used to screen a large number of the parts in order to identify the parts suitable for additive manufacturing. The manual process is used because of difficulty in integrating information from multiple data sources needed to perform the screening. Also, due to a qualitative nature of some of the data used in the screening manual inspection and selection of the parts may be required. This manual process may be laborious and time consuming. Further, this process relies on expertise of personnel performing the screening operation. Accordingly, it may be difficult to screen through each of these parts to arrive at a smaller pool of parts fit for additive manufacturing, leading to inaccuracies in the selection of these parts. Additionally, the manual process may require review every time the 3D model of the part is updated.

U.S. Published Application Number 2015/0205544 describes a system and method for routing object data that defines a 3-dimensional (3D) object to a 3D printer. The networked system is capable of effortlessly routing a 3D object model to one or more 3D printers capable of printing the 3D model. The object data is received at a server and object attributes associated with the object are determined. The system determines a printability indexer for identifying the object attributes and searching a database for one or more 3D printers capable of printing objects that possess the determined object attributes. If one or more capable printers are identified, the server communicates a list that identifies the one or more capable printers to a user. The printability indexer determined by the system is used to identify a suitable 3D printer from a network environment based on attributes of the object. However, the system does not evaluate a feasibility of 3D printing of the object.

Hence, there is a need for an improved method to identify and/or evaluate the parts suitable for additive manufacturing.

SUMMARY OF THE DISCLOSURE

In one aspect of the present disclosure, a method for evaluating part for additive manufacturing is provided. The method includes receiving data related to a set of printability factors associated with the part. The set of printability factors comprise at least: an availability of a three dimensional printer, a build density, a fraction of part to be printed, a print accuracy, a part complexity, and a number of parts needed. The method includes evaluating a printability index associated with the part based on at least three printability factors from the set of printability factors. Further, the method includes displaying the printability index associated with the part for the evaluation of the part for additive manufacturing.

In another aspect of the present disclosure, a system for evaluation of a part for additive manufacturing is provided. The system includes a display unit and a controller. The controller is communicably coupled to the display unit. The controller is configured to receive data related to a set of printability factors associated with the part. The set of printability factors comprise at least: an availability of a three dimensional printer, a build density, a fraction of part to be printed, a print accuracy, a part complexity, and a number of parts needed. The controller is configured to evaluate a printability index associated with the part based on at least three printability factors from the set of printability factors. The controller is configured to evaluate the part for additive manufacturing based on the printability index. The controller is configured to display, on the display unit, a notification of the evaluation of the part.

In yet another aspect of the present disclosure, a non-transitory computer program product is provided. The non-transitory computer program product has computer-executable instructions stored thereon that, if executed by a computer based system is capable of evaluating a part for additive manufacturing. The computer based system is capable of performing operations including determining dimensional data associated with the part based on extraction of the dimensional data from a data file associated with the part. The computer based system is capable of performing operations including determining an availability of a three dimensional printer based on data received from at least one of an external source and a user input. The computer based system is capable of performing operations including determining a part complexity based on a structure of the part extracted from the data file. The computer based system is capable of performing operations including evaluating a printability index associated with the part based on at least the dimensional data, the availability of the three dimensional printer, and the part complexity. The computer based system is capable of performing operations including displaying the printability index associated with the part for the evaluation of the part for additive manufacturing.

Other features and aspects of this disclosure will be apparent from the following description and the accompanying drawings.

BRIEF DESCRIPTION OF THE DRAWINGS

FIG. 3 is an exemplary list of three dimensional printers associated with the evaluation system, according to one embodiment of the present disclosure;

FIG. 7 is a schematic diagram of an exemplary output provided by the evaluation system of FIG. 2, according to one embodiment of the present disclosure;

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
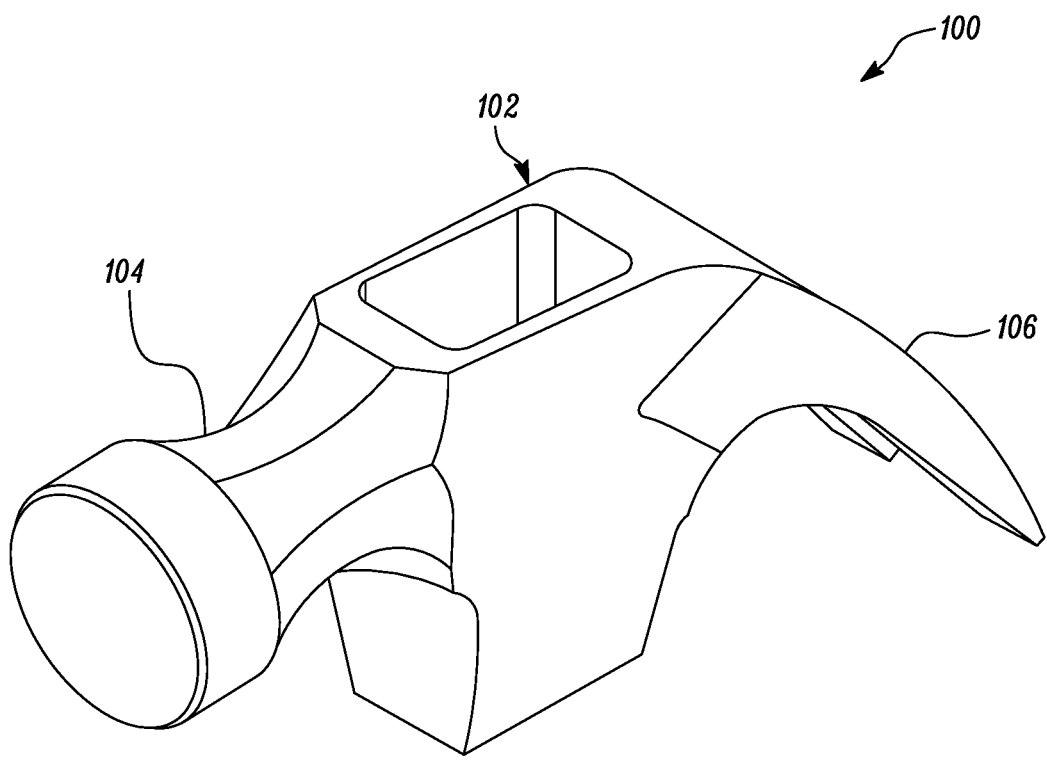
FIG. 1 is a pictorial illustration of an exemplary part, according to one embodiment of the present disclosure.

Referring to FIG. 1, an exemplary part 100 is illustrated. The part 100 is a hammer head 102. The hammer head 102 includes a bell portion 104 and claw portion 106. The claw portion 106 of the hammer head 102 may be used to pull out a nail from a work surface. The bell portion 104 of the hammer head 102 may be used to strike the work surface to push the nail into the work surface. The shape, dimensions, and overall construction of the hammer head 102 is non-limiting of this disclosure. The given part 100 will be used an exemplary object for the purpose of explaining a working of an evaluation system 200 (see FIG. 2) to evaluate the part 100 for additive manufacturing. A person of ordinary skill in the art will appreciate that the given part 100 is included herein merely on an exemplary basis to describe intermediate assessment steps performed by the evaluation system 200 and is replaceable with any other object under consideration for additive manufacturing.

Figure 2:
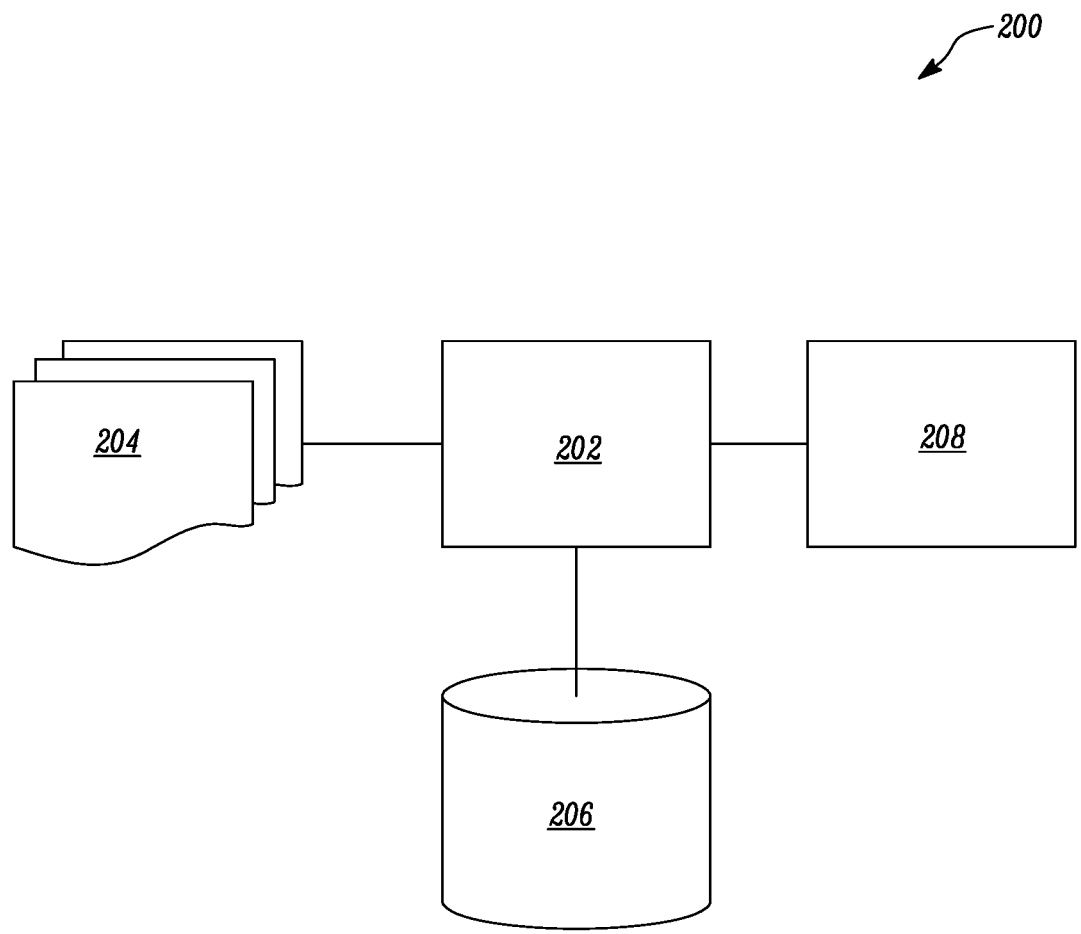
FIG. 2 is a block diagram of an evaluation system, according to one embodiment of the present disclosure.

Referring to FIG. 2, the present disclosure relates to the evaluation system 200 for evaluating a feasibility of the part 100 for undergoing additive manufacturing. The evaluation system 200 includes a controller 202. The controller 202 is configured to receive data associated with various printability factors. These printability factors are evaluated by the controller 202 to determine if it is feasible for the part 100 to undergo additive manufacturing or not. These printability factors include a number of factors that are related to structure and dimensions of the part 100 as created or drawn by a user in a data file 204 associated with the part 100. Further, the printability factors are also take into account characteristics of three dimensional printers (not shown) that may be communicably coupled to the controller 202 for facilitation of additive manufacturing of the part 100. The printability factors also take into account manufacturing needs of the part 100. Each of the printability factors that the evaluation system 200 utilizes for the assessment of the part 100 will be explained in detail later in this section.

Moreover, the controller 202 evaluates a printability index of the part 100 based on data associated with at least some of the printability factors that is received by the controller 202. Accordingly, the controller 202 processes and analyses the data associated with a set of the printability factors that include, but are not limited to, an availability of the three dimensional printer, a build density of the part 100, a fraction of part to be printed, a print accuracy of the part 100, a part complexity, and a number of parts needed. The controller 202 evaluates the printability index of the part 100 on the basis of three or more of the printability factors from the above mentioned set of the printability factors.

In one example, the printability index of the part 100 is evaluated by the controller 202 as a weighted average of all the printability factors: the availability of the three dimensional printer, the build density of the part 100, the fraction of part to be printed, the print accuracy of the part 100, the part complexity, and the number of parts needed. In this example, each of the printability factors is assigned an individual intermediate score on a fixed scale, say out of 10, by the controller 202. The printability index of the part 100 is computed by the controller 202 as follows:

$$PI = X_0 \frac{\sum_{i=1}^{n} w_i x_i}{\sum_{i=1}^{n} w_i}$$ Equation 1

Where:
PI=Printability index
$X_0=\{0, 1\}$, $X_i \varepsilon [0, 10]$, $w_i \varepsilon [0, 1]$, n=5
In the Equation 1, $X_0$-$X_5$ denote the intermediate score and $w_1$-$w_5$ denote the weightage that is assigned to each of the multiple printability factors by the controller 202, and will be explained in detail later in this section. A person of ordinary skill in the art will appreciate that the equation and the contribution of each of the printability factors in the computation of the printability index by the controller 202 given above is exemplary and does not limit the scope of the present disclosure.

In one embodiment, the printability index may be computed by the controller 202 by utilizing the following printability factors: the availability of the three dimensional printers, the build density of the part 100, the fraction of part to be printed, and the part complexity. In another embodiment, the printability index may be computed by the controller 202 by utilizing at least the build density and the part complexity along with one or more other printability factors from the set of the printability factors described earlier. The number of printability factors and their individual contribution or weightage in the computation of the printability index associated with the part 100 may vary based on the application. The computation described herein is on an exemplary basis and may be modified based on the system requirements.

The printability factors include an assessment of the availability of the three dimensional printers by the controller 202. In one embodiment, the controller 202 may be communicably coupled to the three dimensional printers through suitable wired or wireless networks. Accordingly, the controller 202 may ascertain if the three dimensional printer is online or available to carry out a print request associated with the part 100. In another embodiment, the controller 202 is communicably coupled to a database 206 or any other external data source. The database 206 stores information related to the availability of the three dimensional printers that are connected to the network and accessible by the controller 202.

Referring to FIG. 3, the controller 202 may receive data associated with a list 300 of the three dimensional printers connected to the network. Further, the controller 202 assesses if each of the three dimensional printers is available for additive manufacturing of the part 100. For example, the controller 202 may determine a status of the three dimensional printer as online or offline, indicating if the three dimensional printer is ready or not to perform the print request. Additionally, the controller 202 assesses a capability of the three dimensional printer based on the dimensions of the part 100. The controller 202 may extract the dimensions of the part 100 from the data file 204 and compare the dimensions with the capability of the three dimensional printer to check if the part 100 will completely fit into the three dimensional printer. In one embodiment, the part 100 may be checked according to a fixed orientation that is decided upon for the additive manufacturing of the part 100. This orientation of the part 100 may be extracted from the data file 204. Alternatively, maximum dimensions of the part 100 along fixed co-ordinate axes may be compared to that of the three dimensional printer, irrespective of the orientation of the part 100.

In the given example, as in FIG. 3, three printers are listed with their corresponding availability and capability. As can be seen, Printer_1 is online but does not have the capability to print the part 100. Printer_2 is offline, but has the capability to print the part 100. Whereas, Printer_3 is online and has the capability to print the part 100. Accordingly, the controller 202 identifies Printer_3 as a suitable three dimensional printer for the part 100. In one embodiment, the controller 202 may receive this data from the database 206 or any other external source such as, an external data repository. A person of ordinary skill in the art will appreciate that the list 300 of the three dimensional printers provided in the accompanying figures is exemplary and does not limit the scope of the present disclosure. The assessment steps performed by the controller 202 may vary. Further, in one embodiment, the controller 202 may directly receive this assessed data of the availability and/or capability of the three dimensional printers connected to the network from the database 206.

Based on the availability and the capability of the three dimensional printer, the controller 202 assigns a weightage or an intermediate score to the said printability factor. For example, the controller 202 assigns the intermediate score of 1 if the three dimensional printer is available and capable or a score of 0 if the three dimensional printer is not available and/or not capable. Accordingly, the controller 202 assigns the intermediate score (denoted as $X_0$ in Equation 1) of 1 or 0 respectively in the Equation 1 (see above) for the said printability factor which is the availability of the three dimensional printer.

Figure 4:
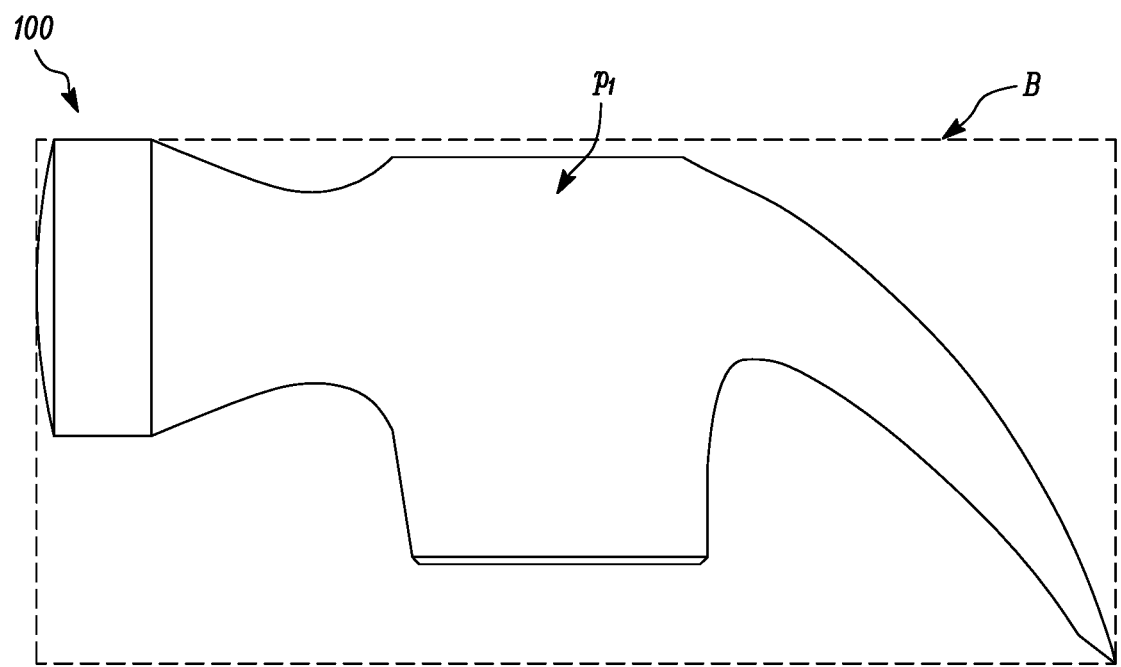
FIG. 4 is a schematic diagram for calculation of build density of the part of FIG. 1, according to one embodiment of the present disclosure.

Another printability factor that the controller 202 may utilize is the build density of the part 100. Referring to FIG. 4, the build density of the part 100 is defined as a ratio of part volume "$p_1$" and volume of a bounding box "B" that surrounds the part 100. The build density of the part 100 is computed by the controller 202 as follows:

$$\text{Build density} = \frac{p_1}{B} \times 100 \qquad \text{Equation 2}$$

Where:
$p_1$=Part Volume and
B=Volume of Bounding Box

In one embodiment, the build density of the part 100 may be extracted by the controller 202 from the data file 204. This data file 204 may include any Computer Aided Design (CAD) file such as an AutoCAD, NX, or CREO file, or .stl fixing software such as NETFABB and MAGICS which contains the part 100 drawn by the user. The controller 202 may assign the weightage and/or the intermediate score to the build density. In one embodiment, the controller 202 compares the build density of the part 100 with a predetermined threshold or range and then assigns the intermediate score based on the comparison. For example, based on the build density that is received by the controller 202, the controller 202 assigns the intermediate score (denoted as $X_1$ in the Equation 1) as follows:

If Build density<$a_1$, $X_1$=10;

If $a_1 \le$Build density<$a_2$, $X_1$=5;

If Build density$\ge a_2$, $X_1$=0      Equation 3

Where:
Build density: Build density of part
$X_1$: Intermediate score for build density of part
$a_1$, $a_2$: Predetermined thresholds A person of ordinary skill in the art will appreciate that the values and ranges provided above are exemplary and non-limiting of the present disclosure. The build density of the part 100 is inversely proportional to the intermediate score ($X_1$) such that a relatively higher build density is assigned a relatively lower intermediate score ($X_1$).

Figure 5:
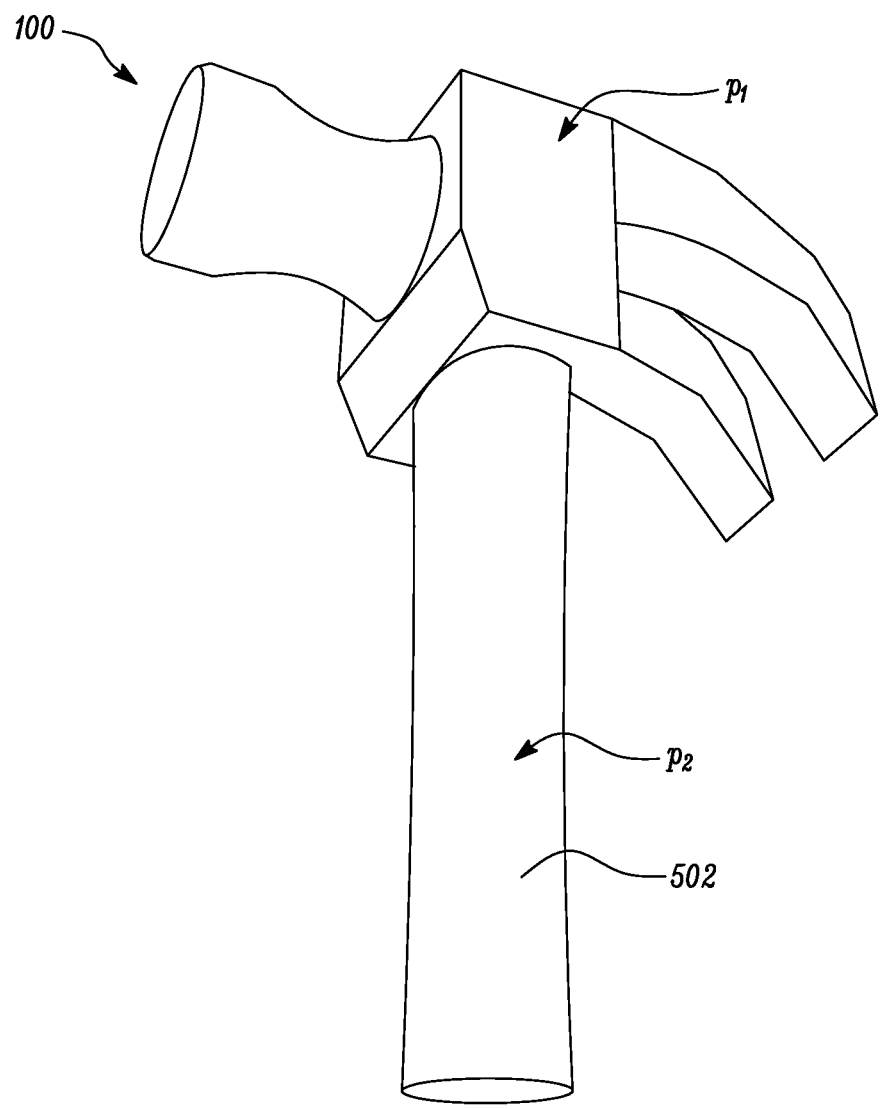
FIG. 5 is a schematic diagram for calculation of fraction of part to be printed for the part of FIG. 1, according to one embodiment of the present disclosure.

The controller 202 may also utilize the fraction of part to be printed as the printability factor. Referring to FIG. 5, the fraction of part to be printed includes fractional information of the part 100 with respect to a prefabricated piece 502. Often times, additive manufacturing of the part 100 is done on top of the prefabricated piece 502. Compared to a total final volume of the part 100, if only a small fraction needs to be formed by additive manufacturing, then the controller 202 determines that the part 100 is favorable for additive manufacturing. The controller 202 determines the fraction of part to be printed as follows:

$$\text{Fraction printed} = \frac{p_1}{p_1 + p_2} \times 100 \qquad \text{Equation 4}$$

Where:
Fraction printed=Fraction of part to be printed
$p_1$=Part Volume
$p_2$=Volume of prefabricated piece The fraction of part to be printed may be extracted by the controller 202 from a metadata file associated with the part 100 and/or may be retrieved from the database 206. Alternatively, referring to FIG. 6, fraction of part to be printed may be entered by a user as a user input. The controller 202 may assign the weightage and/or the intermediate score to the fraction of part to be printed. In one embodiment, the controller 202 compares the fraction of part to be printed with a predetermined threshold or range and then assigns the intermediate score based on the comparison. For example, based on the data related to the fraction of part to be printed as received by the controller 202, the controller 202 assigns the intermediate score (denoted as $X_2$ in the Equation 1) as follows:

If Fraction printed<$b_1$, $X_2$=10;

If $b_1 \le$Fraction printed<$b_2$, $X_2$=5;

If Fraction printed$\ge b_2$, $X_2$=0      Equation 5

Where:
Fraction printed: Fraction of part to be printed
$X_2$: Intermediate score for fraction of part to be printed
$b_1$, $b_2$: Predetermined thresholds A person of ordinary skill in the art will appreciate that the values and ranges provided above are exemplary and non-limiting of the present disclosure. The fraction of part to be printed is inversely proportional to the intermediate score ($X_2$) such that a relatively higher fraction of part to be printed is assigned a relatively lower intermediate score ($X_2$).

Further, the controller 202 may utilize the print accuracy of the part 100 as the printability factor. The controller 202 determines that additive manufacturing of the part 100 is favorable for the parts 100 requiring high print accuracy i.e. if a finer resolution of the manufactured part is desired then the controller 202 determines that the part 100 is favorable for additive manufacturing. The print accuracy of the part 100 may be extracted by the controller 202 from the metadata file associated with the part 100 and/or retrieved from the database 206. Alternatively, referring to FIG. 6, the print accuracy is entered by the user. The controller 202 may assign the weightage and/or the intermediate score to the print accuracy. In one embodiment, the controller 202 compares the print accuracy with the predetermined threshold or range and then assigns the intermediate score based on the comparison. For example, based on the data related to the print accuracy as received by the controller 202, the controller 202 assigns the intermediate score (denoted as $X_3$ in the Equation 1) as follows:

If Accuracy<$c_1$ μm,$X_3$=10;

If $c_2$ μm≤Accuracy<$c_2$ μm,$X_3$=5;

If Accuracy≥$c_2$ μm,$X_3$=0    Equation 6

Where:
Accuracy: Print accuracy of part
$X_3$: Intermediate score for print accuracy of part
$c_1$, $c_2$: Predetermined thresholds
A person of ordinary skill in the art will appreciate that the values and ranges provided above are exemplary and non-limiting of the present disclosure. The part 100 requiring a finer print accuracy is assigned a relatively higher intermediate score ($X_3$).

The controller 202 may utilize the number of parts needed in a predefined time period, example, number of parts needed per year as the printability factor. The controller 202 determines that additive manufacturing of the part 100 is favorable for the parts 100 having lower demand. The number of parts needed may be extracted by the controller 202 from the metadata file associated with the part 100 and/or retrieved from the database 206. Alternatively, referring to FIG. 6, the number of parts needed is entered by the user. The controller 202 may assign the weightage and/or the intermediate score to the number of parts needed. In one embodiment, the controller 202 compares the number of parts needed with the predetermined threshold or range and then assigns the intermediate score based on the comparison. For example, based on the data related to the number of parts as received by the controller 202, the controller 202 assigns the intermediate score (denoted as $X_4$ in the Equation 1) as follows:

If PartsYear<$d_1$,$X_4$=10;

If $d_1$≤PartsYear<$d_2$,$X_4$=5;

If PartsYear≥$d_2$,$X_4$=0    Equation 7

Where:
PartsYear: Number of parts needed
$X_4$: Intermediate score for number of parts needed
$d_1$, $d_2$: Predetermined thresholds A person of ordinary skill in the art will appreciate that the values and ranges provided above are exemplary and non-limiting of the present disclosure.

The controller 202 may also utilize the part complexity as the printability factor. The part complexity of the part 100 is determined by the controller 202 based on a structure of the part 100. The structure of the part 100 is extracted by the controller 202 from the data file 204 that contains the part 100 drawn by the user. The controller 202 assess the structure of the part 100 based on a type and a frequency of operations that are performed by the user to draw the part 100. In one embodiment, when the part 100 is drawn in the CAD file, the controller 202 initially analyses a CAD design tree of the part 100 and counts the number of design operations. Based on this evaluation, the controller 202 computes the intermediate score for the part complexity. For example, the controller 202 assigns the following the intermediate score (comp1) based on the number of design operations (Count) as follows:

If Count<$e_1$,comp$_1$=0;

If $e_1$≤Count<$e_2$,comp$_1$=5;

If Count≥$e_2$,comp$_1$=10    Equation 8

Where:
Count: Number of design operations
comp$_1$: Intermediate score
$e_1$, $e_2$: Predetermined thresholds In a next step, the controller 202 determines a frequency of special operations performed by the user, such as 'Blended' and 'Sweep' etc. as extracted from the CAD file. The controller 202 further multiplies the frequencies with corresponding weights, for example weight (W)ε[0, 1] based on their importance, to obtain a weighted frequency (wCount). The controller 202 then computes another intermediate score (comp2) for the part complexity of the part 100 as follows:

If wCount<$f_1$,comp2=0;

If $f_1$≤wCount<$f_2$,comp2=5;

If wCount≥$f_2$,comp2=10    Equation 9

Where:
wCount: Weighted frequency
comp2: Intermediate score
$f_1$, $f_2$: Predetermined thresholds In one example, limits given above in Equation 9, that is {$f_1$, $f_2$} are computed by the controller 202 using a pseudo machine learning algorithm. Alternatively, the limits may be determined by the controller 202 using any other known method. Further, the controller 202 may determine the intermediate score (denoted as $X_5$ in Equation 1) for the part complexity as a function of the intermediate scores comp1 and comp2. Based on the computed part complexity, the controller 202 classifies the part 100 as: 'Simple', 'Average' or 'Intricate', if the computed final intermediate score (denoted as $X_5$ in Equation 1) of the part 100 is 0, 5, or 10 respectively.

Optionally, the controller 202 may utilize the current manufacturing process of making the part 100 as an additional printability factor. The current manufacturing process may be extracted by the controller 202 from the metadata file associated with the part 100, entered by the user, and/or retrieved from the database 206. For example, based on the current manufacturing process which may include, but not limited to forging, sand casting, and investment casting. The controller 202 may assign the weightage and/or the intermediate score to the current manufacturing process for the computation of the printability index of the part 100.

As discussed earlier, the controller 202 receives the data related to the printability factors from the user, the database 206, or any other external source. The controller 202 evaluates the printability index of the part 100 utilizing three or more of the above described printability factors. In one example, the printability index of the part 100 is computed as a weighted averages of the six printability factors described herein according to the intermediate scores ($X_0$-$X_5$) and the respective weightage ($w_1$-$w_5$) assigned by the controller 202 to each of these printability factors. Alternatively, the printability index can be evaluated by the controller 202 using any other mathematical formula, model, or correlation, without limiting the scope of this disclosure. In the given example, the printability index is evaluated as a total score (computed on a scale of 10).

Referring to FIG. 2, the controller 202 is communicably coupled to a suitable output device 208 such as, a screen, touch display, or any other auditory or visual output unit known in the art. The controller 202 provides a notification of the printability index of the part 100 to the user via the output device 208. Alternatively, the printability index may be computed on any suitable scale based on the application requirements.

Further, the controller 202 compares the printability index with a predetermined threshold $x_f$. Based on the comparison, the controller 202 evaluates a suitability of the part 100 for additive manufacturing. For example, in one case, the predetermined threshold $x_f$ lies between 0 and 10. If the printability index of the part 100, as computed by the controller 202, is less than predetermined threshold $x_f$, then the controller 202 determines that the part 100 is not suitable for additive manufacturing. However, if the printability index of the part 100 is greater than or equal to predetermined threshold $x_f$, then the controller 202 determines that the part 100 is suitable to undergo additive manufacturing. In one embodiment, the controller 202 provides a notification of whether the part 100 should undergo additive manufacturing based on the comparison of the printability index with the predetermined threshold.

The controller 202 may also determine a cost of additive manufacturing of the part 100 based on a cost of a material used, as well as pre and post processing and time required to make the part 100. The controller 202 may also estimate the cost of manufacturing the part 100 using the current manufacturing method, so that the user may make a comparison between producing the part 100 using additive manufacturing and the current manufacturing method based on the displayed associated costs. The costs computed by the controller 202 may be displayed to the user via the output device 208.

The evaluation of the part 100 for additive manufacturing by the controller 202 is an automated process. The controller 202 may evaluate multiple types of different parts using batch processing. The controller 202 may automatically extract the data related to each of the parts and evaluate the printability factors for the respective part.

Figure 6:
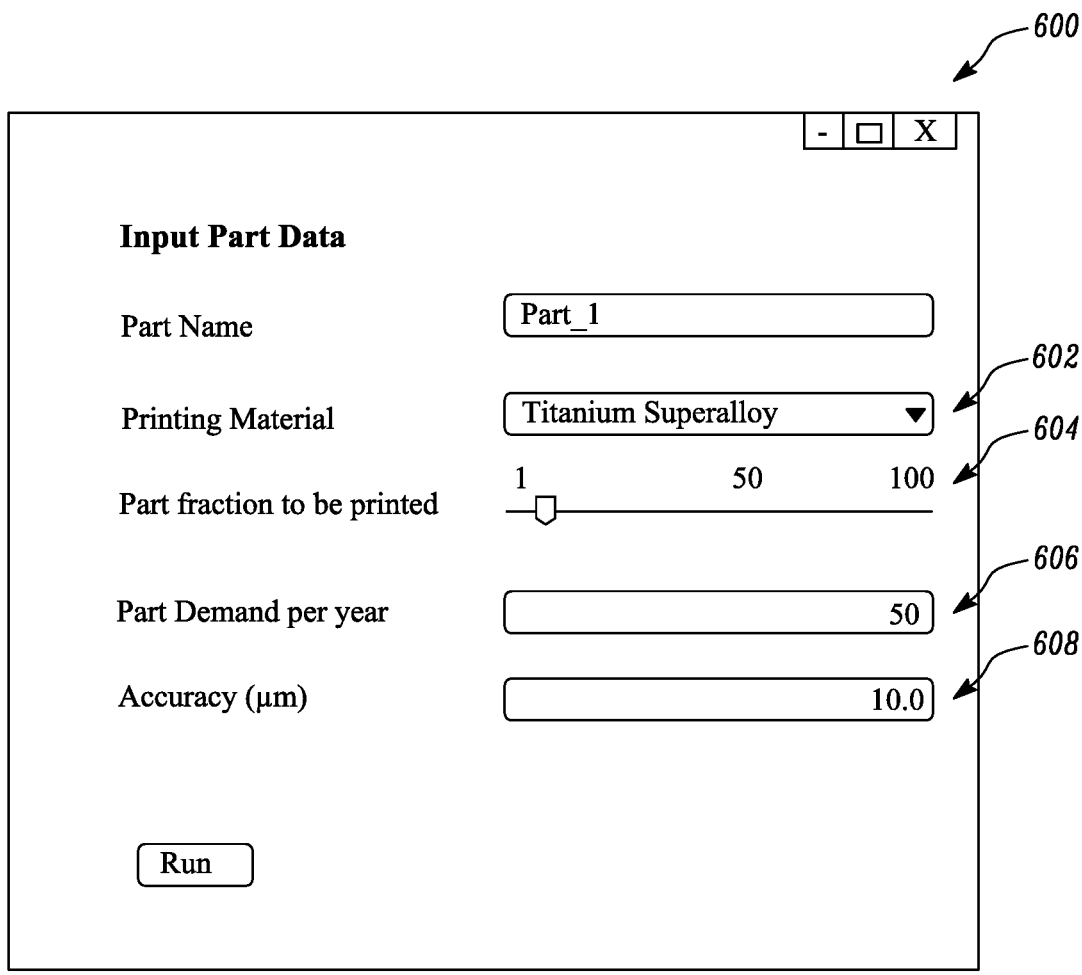
FIG. 6 is a schematic diagram of an exemplary Graphical User Interface (GUI) for entering user inputs, according to one embodiment of the present disclosure.

Referring to FIG. 6, an exemplary user interface 600 for inputting data associated with the printability factors is illustrated. The user interface 600 includes section 602 where the user enters the material used to form the part 100 from a drop down list provided. In this example, the user has entered Titanium super-alloy. Further, at section 604, the user enters the fraction of part to be printed by sliding a scale along 1 to 100. In this case, the user has entered 10%. Further, at section 606, the user enters the number of part to be printed which is 50. At section 608, the user enters the print accuracy as 10 µm. The user interface 600 of FIG. 6 is non-limiting of the present disclosure. Alternatively, any of the described data fields of the user interface 600 may be auto-populated by the controller 202 based on data retrieved from the database 206 and/or extracted from the metadata file.

FIG. 7 is an exemplary output interface 700 of the evaluation system 200. The output interface 700 provides the evaluation of three parts, namely Part_1, Part_2, and Part_3 as performed by the controller 202. At section 702, mass, volume and the dimensional data of the respective parts is displayed by the controller 202. Further, the list of the three dimensional printers that are available and capable of printing the respective parts are displayed at section 704. Further, the controller 202 displays if each of the parts should undergo additive manufacturing or not based on the evaluation of the printability factors. In this example, the predetermined threshold $x_f$ is 7. Since the printability index of the Part_1 is lesser than the predetermined threshold $x_f$, the controller 202 determines that the Part_1 should not undergo additive manufacturing. Further, as the printability index of the Part_2 and the Part_3 is more than the predetermined threshold $x_f$, the controller 202 determines that the Part_2 and the Part_3 should undergo additive manufacturing. The controller 202 also displays the cost of manufacturing each of the parts using additive manufacturing and the current manufacturing method at section 706. The values provided in the output interface 700 are exemplary. The data fields displayed on the output interface 700 may vary based on the application.

Alternatively, the output may be provided to the user in any other format or file type, for example, the output may be downloaded by the user as a text or MICROSOFT EXCEL data file. Additionally, in some embodiments, an image of the part to be printed, that is the image of Part_2 and/or Part_3 may also be provided in the output by the controller 202.

Figure 8:
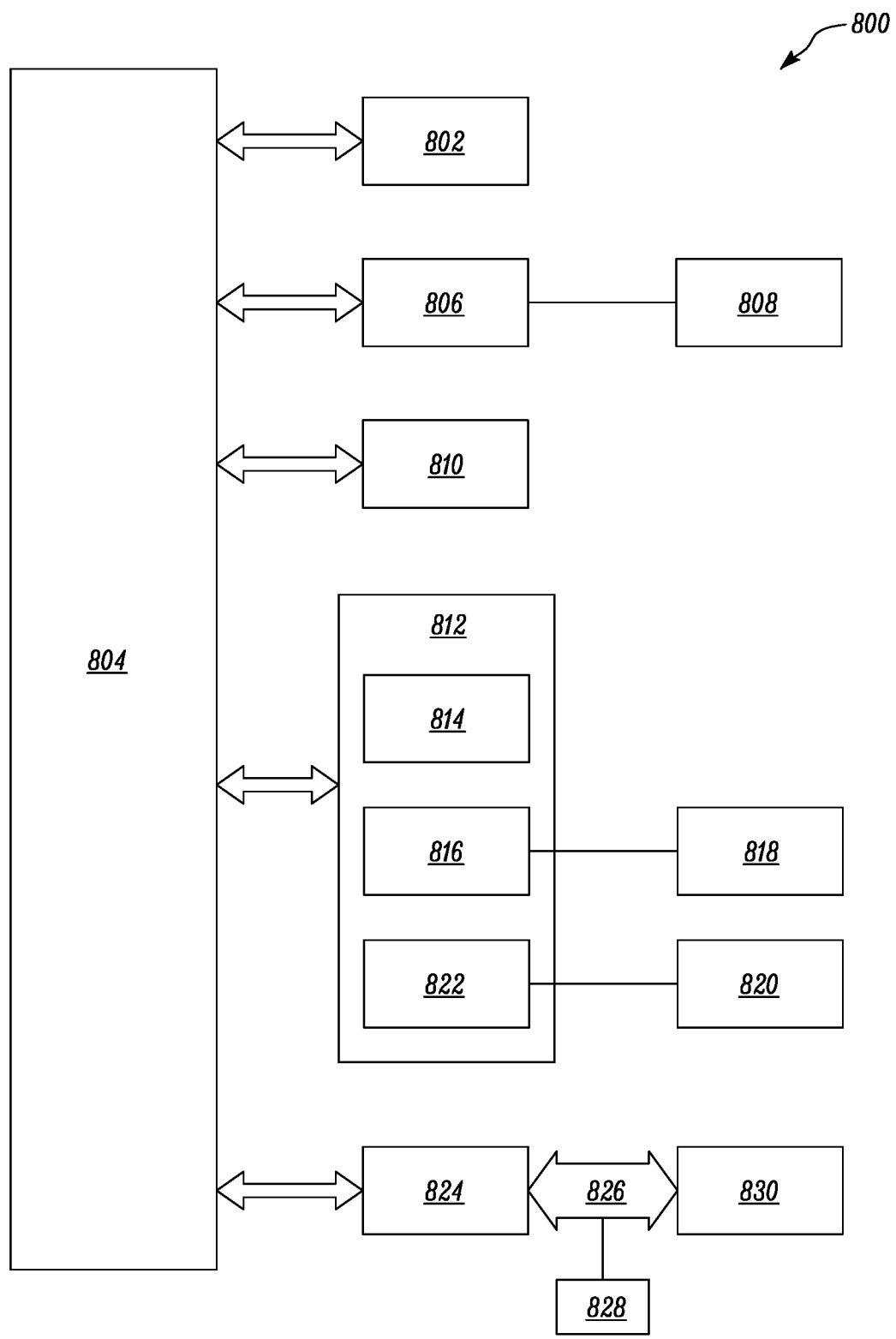
FIG. 8 is a schematic diagram of a low-level implementation of a computer-based system that can be configured to perform functions of the evaluation system, according to one embodiment of the present disclosure.

FIG. 8 is an exemplary low-level implementation of the evaluation system 200 of FIG. 2 for evaluating the part 100 for additive manufacturing. The present disclosure has been described herein in terms of functional block components, modules, and various processing steps. It should be appreciated that such functional blocks may be realized by any number of hardware and/or software components configured to perform the specified functions. For example, a computer based system, hereinafter referred as system 800 may employ various integrated circuit components, e.g., memory elements, processing elements, logic elements, look-up tables, and/or the like, which may carry out a variety of functions under the control of one or more microprocessors or other control devices. Similarly, the software elements of the system 800 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements.

Further, it should be noted that the system 800 may employ any number of conventional techniques for data transmission, signaling, data processing, network control, and/or the like. Still further, the system 800 could be configured to detect or prevent security issues with a user-side scripting language, such as JavaScript, VBScript or the like. In an embodiment of the present disclosure, the net-working architecture between components of the system 800 may be implemented by way of a client-server architecture. In an additional embodiment of this disclosure, the client-server architecture may be built on a customizable.Net (dot-Net) platform. However, it may be apparent to a person ordinarily skilled in the art that various other software frameworks may be utilized to build the client-server architecture between components of the system 800 without departing from the spirit and scope of the disclosure.

These software elements may be loaded onto a general purpose computer, special purpose computer, or other programmable data processing apparatus to produce a machine, such that the instructions that execute on the computer or other programmable data processing apparatus create means for implementing the functions disclosed herein. These computer program instructions may also be stored in a computer-readable memory that can direct a computer or other programmable data processing apparatus to function in a particular manner, such that the instructions stored in the computer-readable memory produce instructions which implement the functions disclosed herein. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions disclosed herein.

The present disclosure (i.e., system 200, system 800, method 900, any part(s) or function(s) thereof) may be implemented using hardware, software or a combination thereof, and may be implemented in one or more computer systems or other processing systems. However, the manipulations performed by the present disclosure were often referred to in terms such as detecting, determining, and the like, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices. In accordance with an embodiment of the present disclosure, the present disclosure is directed towards one or more computer systems capable of carrying out the functionality described herein. An example of the computer based system includes the system 800, which is shown by way of a block diagram in FIG. 8.

The system 800 includes at least one processor, such as a processor 802. The processor 802 may be connected to a communication infrastructure 804, for example, a communications bus, a cross-over bar, a network, and the like. Various software embodiments are described in terms of this exemplary system 800. Upon perusal of the present description, it will become apparent to a person skilled in the relevant art(s) how to implement the present disclosure using other computer systems and/or architectures. The system 800 includes a display interface 806 that forwards graphics, text, and other data from the communication infrastructure 804 for display on a display unit 808.

The system 800 further includes a main memory 810, such as random access memory (RAM), and may also include a secondary memory 812. The secondary memory 812 may further include, for example, a hard disk drive 814 and/or a removable storage drive 816, representing a floppy disk drive, a magnetic tape drive, an optical disk drive, etc. Removable storage drive 816 reads from and/or writes to a removable storage unit 818 in a well-known manner. The removable storage unit 818 may represent a floppy disk, magnetic tape or an optical disk, and may be read by and written to by the removable storage drive 816. As will be appreciated, the removable storage unit 818 includes a computer usable storage medium having stored therein, computer software and/or data.

In accordance with various embodiments of the present disclosure, the secondary memory 812 may include other similar devices for allowing computer programs or other instructions to be loaded into the system 800. Such devices may include, for example, a removable storage unit 820, and an interface 822. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 820 to system 800.

The system 800 may further include a communication interface 824. The communication interface 824 allows software and data to be transferred between the system 800 and external devices 830. Examples of the communication interface 824 include, but may not be limited to a modem, a network interface (such as an Ethernet card), a communications port, a Personal Computer Memory Card International Association (PCMCIA) slot and card, and the like. Software and data transferred via the communication interface 824 may be in the form of a plurality of signals, hereinafter referred to as signals 826, which may be electronic, electromagnetic, optical or other signals capable of being received by the communication interface 824. The signals 826 may be provided to the communication interface 824 via a communication path (e.g., channel) 828. The communication path 828 carries the signals 826 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 816, a hard disk installed in the hard disk drive 814, the signals 826, and the like. These computer program products provide software to the system 800. The present disclosure is also directed to such computer program products.

The computer programs (also referred to as computer control logic) may be stored in the main memory 810 and/or the secondary memory 812. The computer programs may also be received via the communication interface 804. Such computer programs, when executed, enable the system 800 to perform the functions consistent with the present disclosure, as discussed herein. In particular, the computer programs, when executed, enable the processor 802 to perform the features of the present disclosure. Accordingly, such computer programs represent controllers of the system 800.

In accordance with an embodiment of the present disclosure, where the disclosure is implemented using a software, the software may be stored in a computer program product and loaded into the system 800 using the removable storage drive 816, the hard disk drive 814 or the communication interface 824. The control logic (software), when executed by the processor 802, causes the processor 802 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s). In yet another embodiment, the present disclosure is implemented using a combination of both the hardware and the software.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 9:
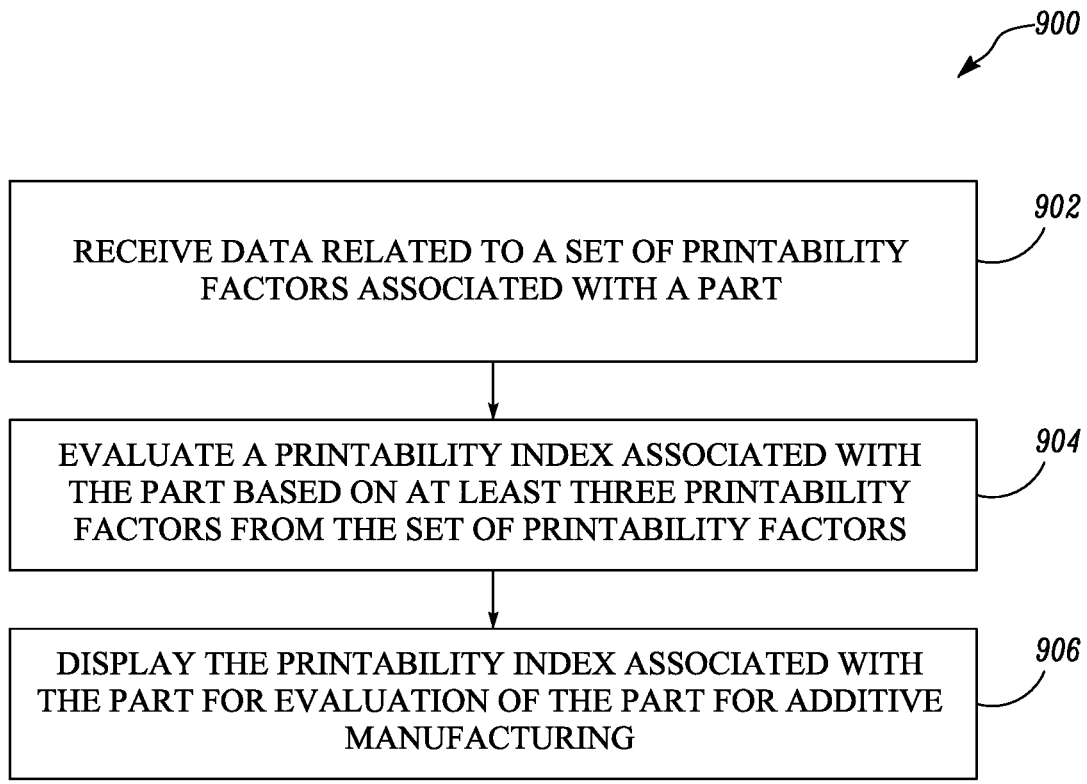
FIG. 9 is a method of operation of the evaluation system, according to one embodiment of the present disclosure.

The present disclosure relates to the evaluation system 200. FIG. 9 is a flowchart of a method 900 of operation of the evaluation system 200. At block 902, the controller 202 receives the data related to the set of printability factors associated with the part 100. As described earlier, the set of printability factors comprise at least: the availability of a three dimensional printer, the build density, the fraction of part to be printed, the print accuracy, the part complexity, and the number of parts needed. At block 904, the controller 202 evaluates the printability index associated with the part 100 based on at least three printability factors from the set of printability factors. At block 906, the controller 202 displays the printability index associated with the part 100 for the evaluation of the part 100 for additive manufacturing.

The controller 202 provides a robust and automated solution for evaluation of the part 100 for additive manufacturing. The system 200 provides an efficient, cost effective solution that requires minimal manual intervention that saves on manual effort and time of personnel. Further, bulk assessment of the parts is easily performed by the system 200, reducing reliance on expertise of the personnel to screen through and select parts for additive manufacturing based on experience. Also, every time a model associated with the part 100 is updated, the system 200 may automatically re-compute the printability index.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method comprising:
receiving, by one or more devices, data related to a set of printability factors associated with a part,
wherein the set of printability factors comprise information associated with one or more of:
an availability of a three-dimensional printer,
a build density,
a fraction of part to be printed,
a print accuracy,
a part complexity, or
a number of parts needed;
assigning, by the one or more devices, a first score to a first printability factor of the set of printability factors;
assigning, by the one or more devices, a second score to a second printability factor of the set of printability factors;
assigning, by the one or more devices, a third score to a third printability factor of the set of printability factors;
evaluating, by the one or more devices, a printability index associated with the part based on at least the first score, a first weight that is assigned to the first printability factor, the second score, a second weight that is assigned to the second printability factor, the third score, and a third weight that is assigned to the third printability factor,
wherein the first printability factor comprises information associated with one of:
the availability of the three-dimensional printer,
the fraction of part to be printed,
the print accuracy,
the part complexity, or
the number of parts needed;
performing, by the one or more devices, an evaluation of the part for additive manufacturing based on the printability index; and
providing, by the one or more devices, information regarding the evaluation of the part for additive manufacturing.

2. The method of claim 1,
wherein the first printability factor includes information associated with the build density, and
wherein the second printability factor includes information associated with the part complexity.

3. The method of claim 1, wherein the third printability factor includes information associated with the fraction of part to be printed.

4. The method of claim 1, wherein the fraction of part to be printed comprises fractional information of the part with respect to a prefabricated piece.

5. The method of claim 1, wherein the availability of the three-dimensional printer indicates a capability of the three-dimensional printer for printing the part based on dimensional data of the part.

6. The method of claim 1, wherein the part complexity is based on at least one of a frequency or a type of operation performed to draw the part.

7. The method of claim 1, wherein the evaluation of the part for additive manufacturing is further based on comparing the printability index with a predetermined threshold.

8. The method of claim 1, wherein providing the information regarding the evaluation of the part for additive manufacturing comprises:
providing a notification to a user of the evaluation of the part for additive manufacturing.

9. The method of claim 1, wherein at least one of the build density, the fraction of part to be printed, or the print complexity is extracted from a data file.

10. The method of claim 9, wherein the data file comprises a Computer Aided Design (CAD) file.

11. The method of claim 1, wherein the printability index is evaluated using batch processing.

12. The method of claim 1, further comprising:
computing a cost of printing the part using additive manufacturing based on a cost of a material used for the part and a processing required for the part.

13. A system comprising:
a memory; and
a controller configured to:
receive data related to a set of printability factors associated with a part,
wherein the set of printability factors comprise information associated with one or more of:
an availability of a three-dimensional printer,
a build density,
a fraction of part to be printed,
a print accuracy,
a part complexity, or
a number of parts needed;
assign a first score to a first printability factor of the set of printability factors;
assign a second score to a second printability factor of the set of printability factors;
assign a third score to a third printability factor of the set of printability factors;
evaluate a printability index associated with the part based on at least the first score, a first weight that is assigned to the first printability factor, the second score, a second weight that is assigned to the second printability factor, the third score, and a third weight that is assigned to the third printability factor,
wherein the first printability factor comprises information associated with one of:
the availability of the three-dimensional printer,
the fraction of part to be printed,
the print accuracy,
the part complexity, or
the number of parts needed;
perform an evaluation of the part for additive manufacturing based on the printability index; and
provide, for display, a notification of the evaluation of the part.

14. The system of claim 13,
wherein the first printability factor includes information associated with the part complexity, and
wherein the part complexity is based on a number of design operations used to design the part.

15. The system of claim 13, wherein the part complexity is based on at least one of a frequency or a type of operation performed to draw the part.

16. The system of claim 13, wherein the evaluation of the part for additive manufacturing is further based on a comparison of the printability index with a predetermined threshold.

17. A non-transitory computer-readable medium storing instructions comprising:
one or more instructions that, when executed by one or more processors, cause the one or more processors to:
assign a first score to a first printability factor of a set of printability factors associated with a part;
assign a second score to a second printability factor of the set of printability factors;
assign a third score to a third printability factor of the set of printability factors;
evaluate a printability index associated with the part based on at least the first score, a first weight that is assigned to the first printability factor, the second score, a second weight that is assigned to the second printability factor, the third score, and a third weight that is assigned to the third printability factor;
perform an evaluation of the part for additive manufacturing based on the printability index; and
provide information regarding the evaluation of the part for additive manufacturing.

18. The non-transitory computer-readable medium of claim 17, wherein the first printability factor includes information associated with one of a build density or a fraction of the part to be printed.

19. The non-transitory computer-readable medium of claim 17, wherein the second printability factor includes information associated with a part complexity that is based on a number of design operations used to design the part.

20. The non-transitory computer-readable medium of claim 17, wherein the second printability factor is a number of parts, of the part, needed in a particular time period.

* * * * *